United States Patent
Gaknoki et al.

(10) Patent No.: US 10,027,236 B1
(45) Date of Patent: Jul. 17, 2018

(54) CONTROLLED POWER CIRCUIT WITH ADJUSTED VOLTAGE FEEDBACK TO REGULATE THE OUTPUT POWER

(71) Applicant: Power Integrations, Inc., San Jose, CA (US)

(72) Inventors: Yury Gaknoki, San Jose, CA (US); Zongqi Hu, Fremont, CA (US); Xiang Wu, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 15/438,026

(22) Filed: Feb. 21, 2017

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 2001/0025* (2013.01)

(58) Field of Classification Search
CPC ..... H02M 2001/0025; H02M 3/33507; H02M 3/33515
See application file for complete search history.

(56) References Cited

U.S. PATENT DOCUMENTS

| 2009/0289557 | A1* | 11/2009 | Itoh | H05B 41/2882 315/127 |
| 2013/0258731 | A1* | 10/2013 | Xu | H02M 1/08 363/78 |
| 2015/0131331 | A1* | 5/2015 | Woo | H02M 3/33523 363/21.01 |
| 2015/0381040 | A1* | 12/2015 | Uan-Zo-Li | H02M 3/1584 323/271 |

* cited by examiner

*Primary Examiner* — Harry Behm
(74) *Attorney, Agent, or Firm* — Andrew J. Borja; Power Integrations, Inc.

(57) ABSTRACT

A controller for use in a power converter includes a sense circuit coupled to generate a feedback signal representative of an output voltage of the power converter. A feedback reference circuit coupled to generate a drive signal in response to the feedback signal. An output power control circuit coupled to receive a current sense signal representative of an output current of the power converter and a power signal representative of a desired value of an output power of the power converter via an interface. The controller modifies the output voltage to regulate to the output power to the desired value.

20 Claims, 4 Drawing Sheets

CONTROLLED POWER CIRCUIT WITH ADJUSTED VOLTAGE FEEDBACK TO REGULATE THE OUTPUT POWER

BACKGROUND OF THE INVENTION

1. Field of the Disclosure

The present invention relates generally to power converters and more specifically power converters with controlled power.

2. Background

Electronic devices use power to operate. Switched mode power converters are commonly used due to their high efficiency, small size, and low weight to power may of today's electronics. Conventional wall sockets provide a high voltage alternating current. In a switching power converter, the high voltage alternating current (ac) input is converted to provide a well-regulated direct current (dc) output through an energy transfer element. The switched mode power converter usually provides output regulation by sensing one or more inputs representative of one or more output quantities and controlling the output in a closed loop. In operation, a power switch is utilized to provide the desired output by varying the duty cycle (typically the ratio of the on time of the switch to the total switching period), varying the switching frequency, or varying the number of pulses per unit time of the switch in a switched mode power converter.

The power converter may provide a regulated output current, output voltage, or output power. In general, when regulating the output current to a desired value, the output current is measured and one or more parameters of the power switch is varied until the output current reaches the desired value. Similarly, output voltage is generally sensed when regulating the output voltage to a desired value. Output power is the product of the output voltage and the output current. In regulating output power, the output voltage is generally measured and one or more parameters of the power switch is varied until the output current reaches the target value which provides the desired output power.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
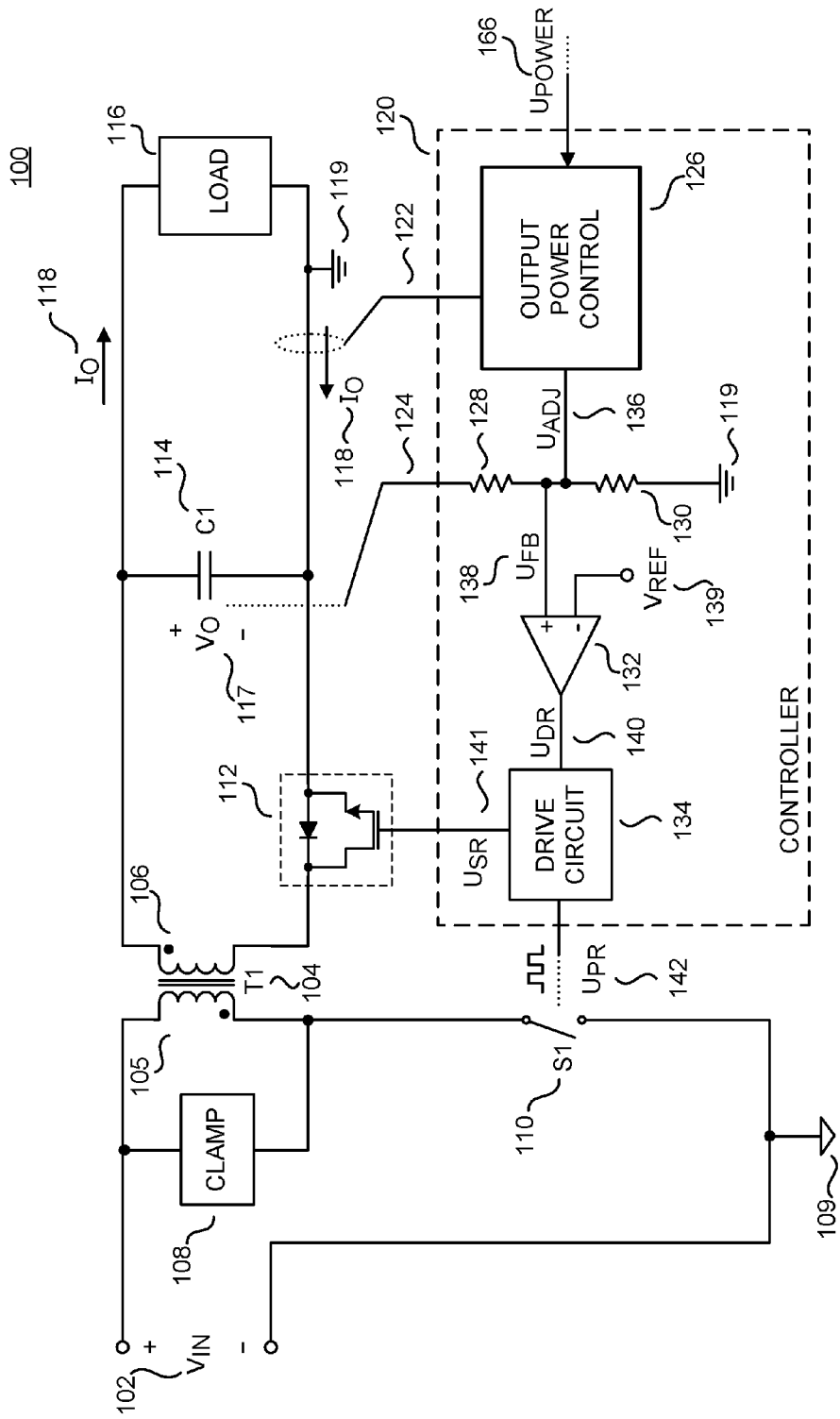
FIG. 1 illustrates one example of a power converter which includes an output power control circuit in accordance with teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Output power is the product of the output voltage and the output current. In regulating output power, the output voltage is generally measured and one or more parameters of the power switch are varied until the output current reaches the target value which provides the desired output power. However, output voltage changes quickly over time as compared to the output current and this may result in a constant adjustment of the output current and instability of the control loop.

In embodiments of the present invention, the output current is measured and the one or more parameters of the power switch are varied until the output voltage reaches the target value and the power converter provides the desired output power. Further, the measurement of the output current and subsequent calculation of the output voltage to provide a controlled output power is implemented digitally.

The controller of the power converter receives a current sense signal, representative of the output current of the power converter and converts the current sense signal to a digital current sense signal. The digital current sense signal is then filtered and stabilized. Using the filtered signal, the controller calculates the desired output voltage signal and provides an adjust signal. The adjust signal modifies either a feedback signal or a reference signal such that the sensed output voltage reaches a target value which provides the desired output power.

To illustrate, FIG. 1 illustrates one example of a power converter 100 including a controller 120 with an output power control circuit 126 in accordance with the teachings of the present invention. The power converter 100 is coupled in a flyback topology with a synchronous rectifier, also referred to as a secondary switch, as the output rectifier 112. However, it should be appreciated that other converter topologies could be used as well as non-synchronous output rectifiers, such as a diode. The power converter 100 provides output power to the load 116 from an unregulated input voltage $V_{IN}$ 102. In one example, the input voltage $V_{IN}$ 102 is a rectified ac input voltage. The input voltage $V_{IN}$ 102 is received by the energy transfer element T1 104 which is shown as including two windings, a primary winding 105 and a secondary winding 106 and is utilized to transfer energy between the input and the output of the power converter 100. The primary winding 105 is coupled to power switch S1 110 which is then further coupled to input return 109. The clamp circuit 108 is shown as coupled across the primary winding 105 and limits the voltage across the power switch S1 110. The secondary winding 106 is shown as coupled to the output rectifier 112, exemplified as a transistor used as a synchronous rectifier. Both the output capacitor C1 114 and the load 116 are shown as coupled to the output rectifier 112. An output is provided to the load as regulated output voltage $V_O$ 117, regulated output current $I_O$ 118, or a combination of the two (such as a regulated output power).

The controller 120 is shown as including the output power control circuit 126, resistors 128, 130, a comparator 132, and a drive circuit 134. The controller 120 is coupled to receive a voltage sense signal 124 representative of the output voltage $V_O$ 117 and a current sense signal 122 representative of the output current $I_O$ 118. The controller 120 also outputs the secondary drive signal $U_{SR}$ 141, which controls the output rectifier 112, and the primary drive signal $U_{PR}$ 142, which controls the switching of the power switch S1 110. The controller 120 controls the output rectifier 112 and the power switch S1 110 to regulate the output voltage $V_O$ 117, output current $I_O$ 118, or output power to a desired value. In one example, the controller 120 senses the output current $I_O$ 118 to modify the output voltage $V_O$ 117 to regulate the output power to a desired value.

As shown, the comparator 132 is coupled to receive the reference $V_{REF}$ 139 and the feedback signal $U_{FB}$ 138. In one example, comparator 132 may be referred to as a reference feedback circuit. In the example shown, the voltage sense signal 124 is received by the resistors 128, 130, which are coupled as a voltage divider. In one example, the resistors 128, 130 may be referred to as a sense circuit. The feedback signal $U_{FB}$ 138 is the output of the voltage divider of resistors 128, 130 and as such, the feedback $U_{FB}$ 138 is also representative of the output voltage $V_O$ 117. In other words, the feedback signal $U_{FB}$ 138 is the voltage across resistor 130. The output power control circuit 126 receives the current sense signal 122 and the power signal $U_{POWER}$ 166. Power signal $U_{POWER}$ 166 is representative of the desired value of the output power of the power converter 100. In one example, the power signal $U_{POWER}$ 166 may be set by a user and provided to the controller via an interface, such as an inter-integrated circuit (I2C). The output power control circuit 126 outputs the adjust signal $U_{ADJ}$ 136 to comparator 132. The output of the output power control circuit 126 is coupled between resistors 128, 130 and adjusts the feedback signal $U_{FB}$ 138 in response to the output current $I_O$ 122.

The output of comparator 132 is the drive signal $U_{DR}$ 140, which is received by the drive circuit 134. Drive signal $U_{DR}$ 140 is representative of the switching of power switch S1 110. In other words, the drive signal $U_{DR}$ 140 indicates to the drive circuit 134 whether or not the power switch S1 110 should be turned on. For the example illustrated, the drive circuit 134 receives the drive signal $U_{DR}$ 140 and generates the primary drive signal $U_{PR}$ 142 and the secondary drive signal $U_{SR}$ 141 in response to the drive signal $U_{DR}$ 140. As mentioned above, the primary drive signal $U_{PR}$ 142 controls opening and closing of the power switch S1 110. It is generally understood that a switch that is closed may conduct current and is considered on, while a switch that is open cannot conduct current and is considered off. In one example, the switch S1 110 may be a transistor such as a metal-oxide-semiconductor field-effect transistor (MOSFET). In another example, controller 120 may be implemented as a monolithic integrated circuit or may be implemented with discrete electrical components or a combination of discrete and integrated components. Controller 120 and switch S1 110 could form part of an integrated circuit that is manufactured as either a hybrid or monolithic integrated circuit.

In operation, the power converter 100 provides a regulated output voltage $V_O$ 117, output current $I_O$ 118, or output power $P_O$ by controlling the transfer of energy between the primary winding 105 and the secondary winging 106. The transfer of energy is controlled by controlling the operation of the power switch S1 110 and the output rectifier 112. For providing a controlled output power $P_O$, the controller 120 senses the output current $I_O$ 118 to modify the output voltage $V_O$ 117 to regulate the output power $P_O$ to the desired value. The output power control circuit 126 receives the sensed output current $I_O$ 118 and the power signal $U_{POWER}$ 166 and calculates the wanted output voltage $V_O$ 117 which would provide the desired output power $P_O$. The output power control circuit 126 then outputs the adjust signal $U_{ADJ}$ 136, which alters the feedback signal $U_{FB}$ 138. As such, the drive signal $U_{DR}$ 140 is then altered and the output voltage $V_O$ 117 is modified to a value which provides the desired output power $P_O$.

Figure 2:
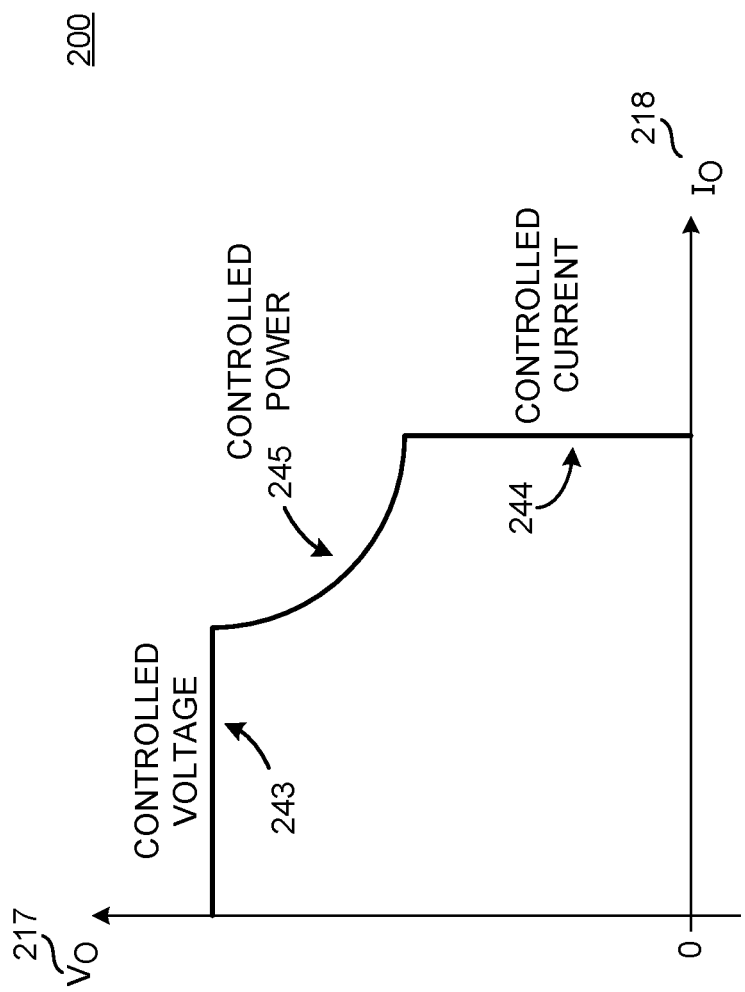
FIG. 2 illustrates an example graph of the relationship between output current and output voltage of the power converter of FIG. 1 in accordance with the teachings of the present invention.

FIG. 2 illustrates a graph 200 of the relationship between output current $I_O$ 218 and output voltage $V_O$ 217. The graph 200 further shows the different operating regions of the power converter 100 discussed above with respect to FIG. 1. As shown, the power converter has three regions of operation: a controlled voltage region 243, a controlled current region 244, and a controlled power region 245. For the controlled voltage region 243, the output voltage $V_O$ 217 is substantially constant while the output current $I_O$ 218 may vary, as illustrated by the line parallel with the horizontal axis. In general, the output voltage $V_O$ 217 is sensed to regulate the output voltage $V_O$ 217 in the controlled voltage region 243. Similarly, for the controlled current region 244, the output current $I_O$ 218 is substantially constant while the output voltage $V_O$ 217 may vary, as illustrated by the line parallel with the vertical axis. The output current $I_O$ 218 is generally sensed to regulate the output current $I_O$ 218 in the controlled current region 244.

For the controlled power region 245, the line is arched to indicate that the output power $P_O$ is controlled to a desired value. In one example, the desired value is substantially constant. Examples of the present disclosure sense the output current $I_O$ 218 to control the output voltage $V_O$ 217 to a value which regulates the output power $P_O$ to the desired value.

Figure 3:
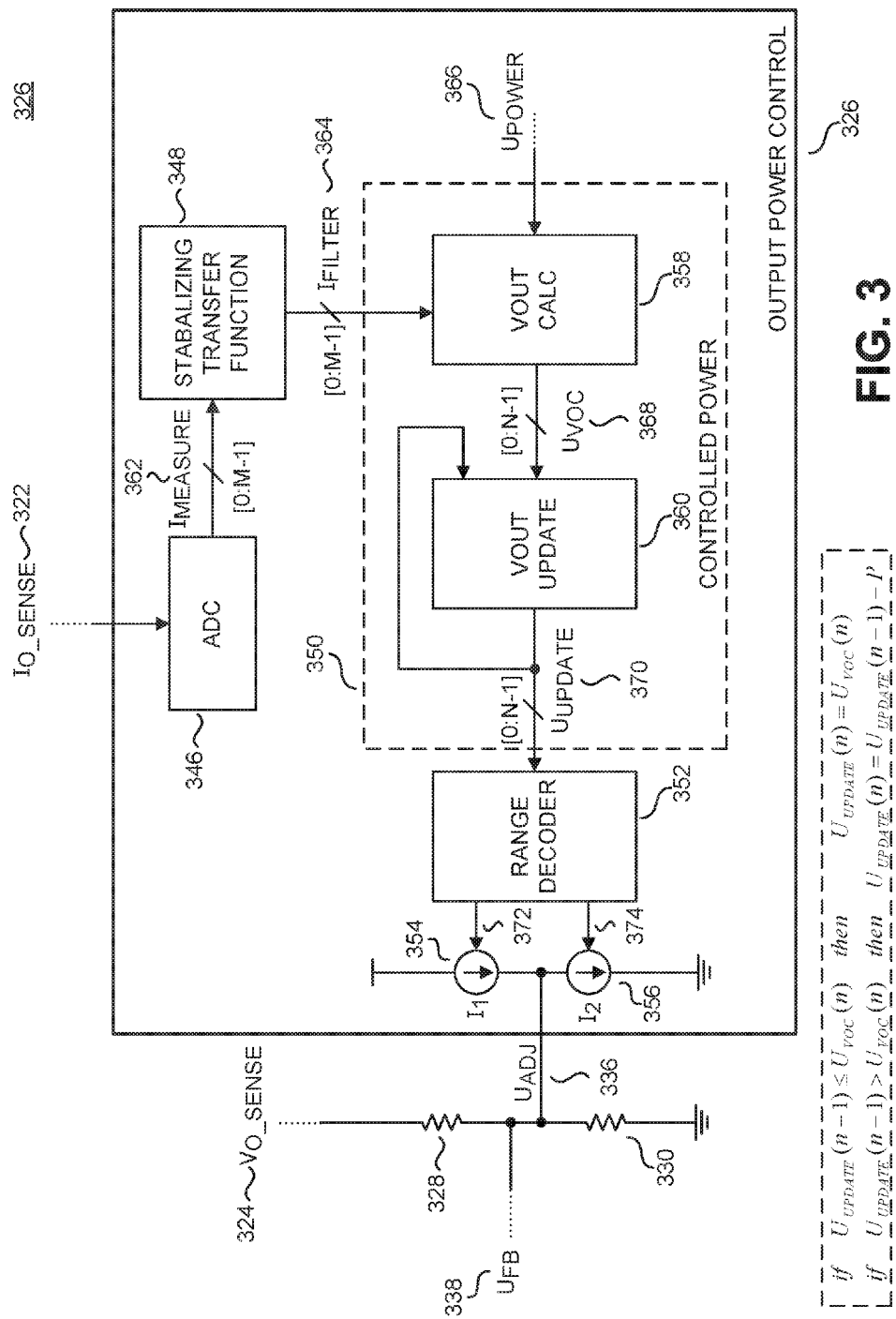
FIG. 3 illustrates an example output power control circuit shown in FIG. 1 in accordance with the teachings of the present invention.

FIG. 3 illustrates an example output power control circuit 326, which is one example of the output power control circuit 126 discussed with respect to FIG. 1. As shown, the output power control circuit 326 includes an analog-to-digital converter (ADC), stabilizing transfer function circuit 348, controlled power circuit 350, a range decoder 352, and current sources 354, 356 with currents $I_1$ and $I_2$, respectively. Further shown in FIG. 3 are resistors 328, 330, which are the same as resistors 128, 130 in FIG. 1. It should be appreciated similarly named and numbered elements couple and function as described above.

The output power control circuit 326 is coupled to receive the current sense signal 322 (representative of the output current $I_O$) at the ADC 346. The ADC 346 converts the analog sensed output current $I_O$ to a digital signal. The output of the ADC 346 is the current measure signal $I_{MEASURE}$ 362, which is an M-bit digital signal representative of the output current $I_O$. In one example, the current measure signal $I_{MEASURE}$ 362 is an eight-bit digital word. In general, the greater number of bits correspond with greater resolution of the measurement of the output current $I_O$.

The stabilizing transfer function circuit 348 is coupled to receive the current measure signal $I_{MEASURE}$ 362 and outputs the filter signal $I_{FILTER}$ 364. In one example, the filter signal $I_{FILTER}$ 364 is also an M-bit digital signal. The stabilizing transfer function circuit 348 applies a digital transfer function to reshape the current measure signal $I_{MEASURE}$ 362 to stabilize the control loop of the controller. The stabilizing transfer function circuit 348 allows the controller to gradually change the output voltage $V_O$ to a value which regulates the output power $P_O$. The outputted filter signal $I_{FILTER}$ 364 is a function of the previously outputted filter signal $I_{FILTER}$ 364, the current measure signal $I_{MEASURE}$ 362, and the constant K:

$$I_{FILTER}(n) = I_{FILTER}(n-1) + K(I_{MEASURE}(n) - I_{FILTER}(n-1))$$

$$K < 1 \quad (1)$$

In one example, the constant K allows adjustment of how quickly the controller responds to changes in the output current $I_O$. Or in other words, the constant K may be used to control the dynamic response of the system. The constant K is the proportional gain factor in proportional-integral-derivative (PID) controllers. For example K substantially equal to one corresponds to a very fast response while K substantially equal to zero corresponds to no response. In one example, K is substantially equal to 0.5.

Controlled power circuit 350 is coupled to receive the filter signal $I_{FILTER}$ 364 and outputs the update signal $U_{UPDATE}$ 370. The controlled power circuit 350 also receives the power signal $U_{POWER}$ 366, which is representative of the desired value of the output power $P_O$ of the power converter. Power signal $U_{POWER}$ 366 may be provided by to the controller 326 by a user through a digital interface such as an inter-integrated circuit (I2C). The controlled power circuit 350 calculates the output voltage $V_O$ to provide the desired output power $P_O$ and determines how to update the output voltage $V_O$.

As shown, the controlled power circuit 350 includes the calculator circuit 358 and the update circuit 360. The calculator circuit 358 is coupled to receive the filter signal $I_{FILTER}$ 364 and the power signal $U_{POWER}$ 366 and calculates the value of the output voltage $V_O$ which provides the desired output power $P_O$. The calculated value is outputted by the calculator circuit 358 as the calculated output voltage signal $U_{VOC}$ 368 and can be described by the function:

$$U_{VOC} = \frac{U_{POWER}}{I_{FILTER}} \quad (2)$$

In one example, the calculated output voltage signal $U_{VOC}$ 368 is an N-bit digital signal. In one example, N is substantially twelve. The number of bits selected for the calculated output voltage signal $U_{VOC}$ 368 determines the resolution for how quickly the output voltage $V_O$ may be changed.

The update circuit 360 is coupled to receive the calculated output voltage signal $U_{VOC}$ 368 and output the update signal $U_{UPDATE}$ 370. As shown, the update signal $U_{UPDATE}$ 370 is received by the range decoder 352 and as an input to the update circuit 360. The update signal $U_{UPDATE}$ 370 is representative of how quickly and/or the amount which the output voltage $V_O$ of the power converter is modified and is also an N-bit digital signal. In one example, if the previous value of the update signal $U_{UPDATE}$ 370 is less than to the calculated output voltage signal $U_{VOC}$ 368 currently received, this may indicate that the output power $P_O$ is too low and the output voltage $V_O$ should be increased. As such, the update signal $U_{UPDATE}$ 370 is set to substantially the calculated output voltage signal $U_{VOC}$ 368 such that the controller may vary the output voltage $V_O$ to reach the desired output power $P_O$. If the previous value of the update signal $U_{UPDATE}$ 370 is substantially equal to the calculated output voltage signal $U_{VOC}$ 368 currently received, the update signal $U_{UPDATE}$ 370 is set to the calculated output voltage signal $U_{VOC}$ 368.

If the previous value of the update signal $U_{UPDATE}$ 370 is greater than the calculated output voltage signal $U_{VOC}$ 368 currently received, this may indicate that the output power $P_O$ is too high and the output voltage $V_O$ should be decreased. However, the update signal $U_{UPDATE}$ 370 is not immediately set to the calculated output voltage signal $U_{VOC}$ 368. This may be done for increased stability. As such, the update signal $U_{UPDATE}$ 370 is set to substantially the previous value of the update signal $U_{UPDATE}$ 370 minus a constant P. Mathematically this may be represented:

if $U_{UPDATE}(n-1) \leq U_{VOC}(n)$ then $U_{UPDATE}(n) = U_{VOC}(n)$ if $U_{UPDATE}(n-1) > U_{VOC}(n)$ then $U_{UPDATE}(n) = U_{UPDATE}(n-1) - P \quad (3)$ Where the constant P may be a trim option set by a user to determine how quickly the update signal $U_{UPDATE}$ 370 is decreased to substantially the calculated output voltage signal $U_{VOC}$ 368. For example, the constant P could be set to one or two.

The range decoder 352 receives the update signal $U_{UPDATE}$ 370 and outputs first signal 372 and second signal 374 to the controlled current sources 354 and 356, respectively. The controlled current sources 354 and 356 are coupled together such that the terminal between the current sources 354, 356 is the output of the output power control circuit 326 and provides the adjust signal $U_{ADJ}$ 336. The range decoder 352 interprets update signal $U_{UPDATE}$ 370 and determines how much current (via adjust signal $U_{ADJ}$ 336) is sourced or sinked from the resistor divider of resistors 328, 330 via the adjust signal $U_{ADJ}$ 336. Once interpreted, the range decoder 352 converts the digital update signal $U_{UPDATE}$ 370 to an analog signal (first signal 372 and/or second signal 374) which controls either the current source 354 or current source 356. The amount of current $I_1$ and current $I_2$ provided by current sources 354, 356, respectively is controlled by the first and second signal 372, 374, respectively. As such, the output power control circuit 326 provides the adjust signal $U_{ADJ}$ 336 to adjust the feedback signal $U_{FB}$ 338 to control the output voltage $V_O$ to the calculated output voltage $U_{VOC}$ 368 determined by the calculator circuit 358.

Figure 4:
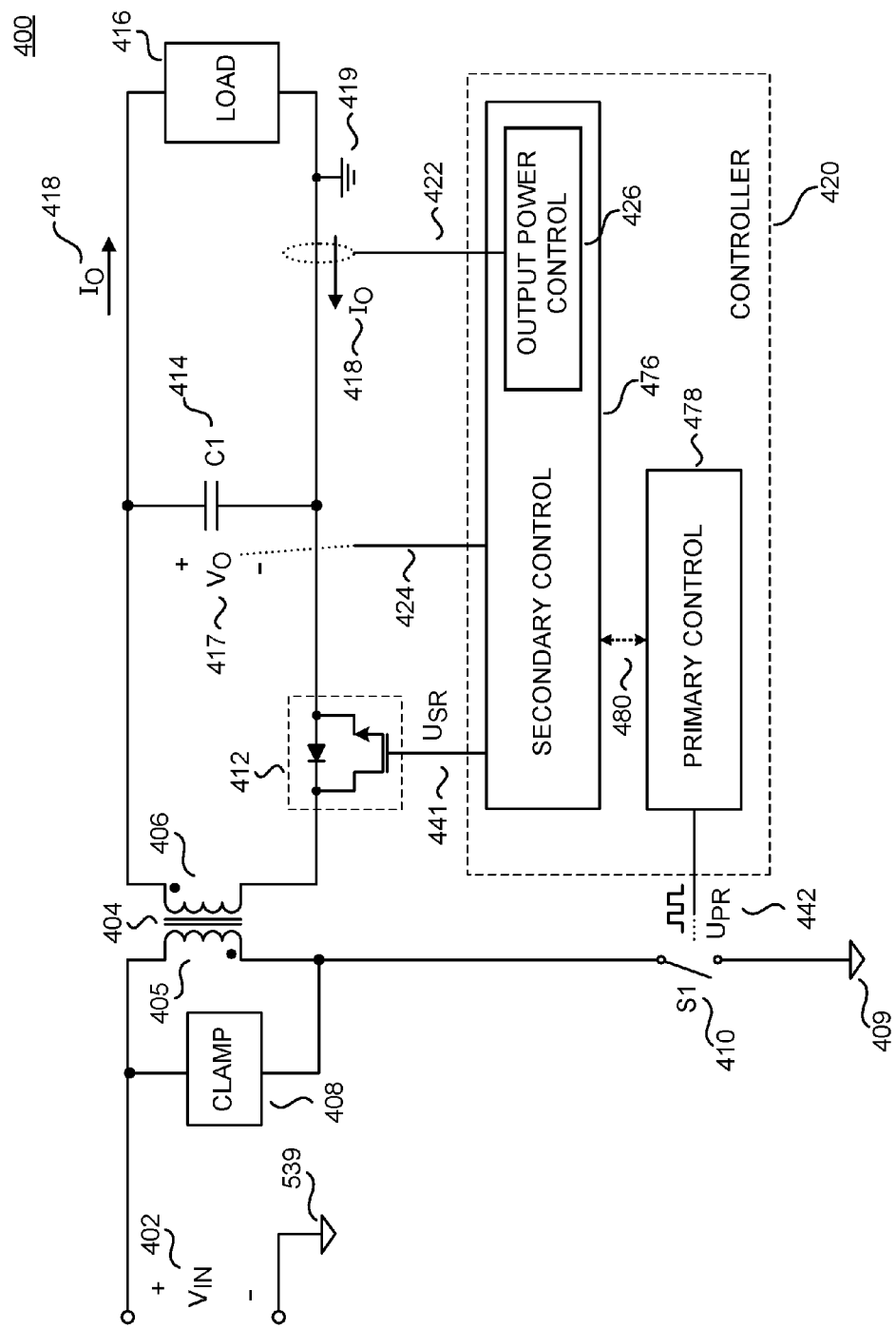
FIG. 4 illustrates another example power converter which includes a primary controller and a secondary controller coupled to a output power control circuit in a monolithic circuit in accordance with the teachings of the present invention.

FIG. 4 illustrates another power converter 400 which includes a controller 420 which utilizes the output power control circuit 426. It should be understood that similarly named and numbered elements couple and function as discussed above. The power converter 400 is similar to the power converter 100 illustrated in FIG. 1, however the controller 420 includes a secondary controller 476 and a primary controller 478. Primary controller 478 controls the switching of the power switch S1 410 via the primary drive signal $U_{PR}$ 442, while the secondary controller 480 controls the switching of the secondary switch 412 via the secondary drive signal $U_{SR}$ 441. As mentioned above, the secondary switch 412 may be exemplified as a synchronous rectifier. The primary controller 478 and secondary controller 476 may communicate via communication link 480. In the example shown, the secondary controller 476 includes the output power control circuit 426. In addition, elements of the drive circuit 134 discussed with respect to FIG. 1 would be included in both the secondary controller 476 and the primary controller 478. For example, the drive signal 140 (of FIG. 1) could be generated by the secondary controller 476 and communicated to the primary controller 478 via the communication link 480.

In one example, primary controller 478 and secondary controller 476 may be formed as part of an integrated circuit that is manufactured as either a hybrid or monolithic integrated circuit, which is shown as controller 420. In one example the power switch S1 410 may also be integrated in a single integrated circuit package with controller 420. In another example the secondary switch 412 may be integrated in a single integrated circuit package with controller 420. However, in another example, it should be appreciated that both the primary controller and the secondary controller need not be included in a single controller package, and for example may be implemented in separate controller packages. In addition, in one example, primary controller 478 and secondary controller 476 may be formed as separate integrated circuits.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

The invention claimed is:

1. A controller for use in a power converter, comprising:
   a sense circuit coupled to generate a feedback signal representative of an output voltage of the power converter;
   a feedback reference circuit coupled to generate a drive signal in response to the feedback signal, wherein the drive signal is used to control switching of a power switch of the power converter to regulate the output voltage; and
   an output power control circuit coupled to receive a current sense signal representative of an output current of the power converter and a power signal representative of a desired value of an output power of the power converter via an interface, wherein the output power control circuit generates an adjust signal to adjust the feedback signal such that the controller modifies the output voltage to regulate to the output power to the desired value,
   wherein the output power control circuit further comprises:
      an analog-to-digital converter (ADC) coupled to receive the current sense signal and provide a measure signal which is a digital representation of the output current; and
      a controlled power circuit coupled to receive the measure signal and the power signal, wherein the controlled power circuit determines a calculated value of the output voltage which corresponds with the desired value of the output power and outputs an update signal which updates the adjust signal in response to the calculated value, wherein the update signal is substantially equal to the calculated value if a previous value of the update signal is less than or equal to the calculated value.

2. The controller of claim 1, wherein the feedback reference circuit is coupled to receive a reference signal.

3. The controller of claim 1, wherein the feedback reference circuit includes a comparator.

4. The controller of claim 1, wherein the controller further comprises a drive circuit coupled to generate a primary drive signal to control switching of the power switch in response to the drive signal.

5. The controller of claim 1, wherein the controller further comprises a drive circuit coupled to generate a secondary drive signal to control switching of a secondary switch in response to the drive signal.

6. The controller of claim 5, wherein the secondary switch includes a synchronous rectifier.

7. The controller of claim 1, wherein the interface is an inter-integrated circuit (I2C).

8. The controller of claim 1, wherein the output power control circuit further comprises a stabilizing transfer circuit coupled to receive the measure signal and output a filter signal to the controlled power circuit, wherein the stabilizing transfer circuit applies a digital transfer function to reshape the measure signal, wherein the controlled power circuit determines the calculated value of the output voltage in response to the filter signal.

9. The controller of claim 8, wherein the filter signal is a function of a previous value of the filter signal and the measure signal.

10. The controller of claim 1, wherein the update signal is substantially equal to a previous value of the update signal minus a constant if the previous value of the update signal is greater than the calculated value.

11. The controller of claim 1, wherein the output power control circuit further comprises:
    a range decoder coupled to receive the update signal and output a first and second signal;
    a first and second current source coupled to receive the first and second signal, wherein the adjust signal is generated by the first and second current source.

12. A power converter comprising:
    an energy transfer element coupled between an input of the power converter and an output of the power converter;

a power switch coupled to the energy transfer element; and a controller coupled to the power switch to control switching of the power switch to regulate a transfer of energy from an input of the power converter to the output of the power converter, wherein the controller includes:

a sense circuit coupled to generate a feedback signal representative of an output voltage of the power converter;

a feedback reference circuit coupled to generate a drive signal in response to the feedback signal, wherein the drive signal is used to control switching of a power switch of the power converter to regulate the output voltage; and an output power control circuit coupled to receive a current sense signal representative of an output current of the power converter and a power signal representative of a desired value of an output power of the power converter via an interface, wherein the output power control circuit generates an adjust signal to adjust the feedback signal such that the controller modifies the output voltage to regulate to the output power to the desired value, wherein the output power control circuit further comprises:

an analog-to-digital converter (ADC) coupled to receive the current sense signal and provide a measure signal which is a digital representation of the output current; and a controlled power circuit coupled to receive the measure signal and the power signal, wherein the controlled power circuit determines a calculated value of the output voltage which corresponds with the desired value of the output power and outputs an update signal which updates the adjust signal in response to the calculated value, wherein the update signal is substantially equal to the calculated value if a previous value of the update signal is less than or equal to the calculated value.

13. The power converter of claim 12 further comprising a rectifier coupled to the output of the power converter to rectify the output of the power converter.

14. The power converter of claim 13 wherein the rectifier comprises a synchronous rectifier circuit comprising a switch coupled to rectify the output of the power converter.

15. The power converter of claim 14 further comprising a secondary controller coupled to generate a secondary control signal to be received by the synchronous rectifier circuit.

16. The power converter of claim 15 wherein the secondary controller is further coupled to the output power control circuit.

17. The power converter of claim 12, wherein the output power control circuit further comprises a stabilizing transfer circuit coupled to receive the measure signal and output a filter signal to the controlled power circuit, wherein the stabilizing transfer circuit applies a digital transfer function to reshape the measure signal, wherein the controlled power circuit determines the calculated value of the output voltage in response to the filter signal.

18. The power converter of claim 17 wherein the filter signal is a function of a previous value of the filter signal and the measure signal.

19. The power converter of claim 12, wherein the update signal is substantially equal to a previous value of the update signal minus a constant if the previous value of the update signal is greater than the calculated value.

20. The power converter of claim 12, wherein the output power control circuit further comprises:

a range decoder coupled to receive the update signal and output a first and second signal;

a first and second current source coupled to receive the first and second signal, wherein the adjust signal is generated by the first and second current source.

* * * * *